United States Patent [19]

Singleton, Jr. et al.

[11] 4,448,238
[45] May 15, 1984

[54] HEAT EXCHANGE SYSTEM AND PROCESS FOR HEATING AND COOLING USING GEOTHERMAL ENERGY

[76] Inventors: Lewis Singleton, Jr., Palo Duro Club, Rte. 2, Canyon, Tex. 79015; James M. Whitney, 3403 Paramount, Amarillo, Tex. 79109

[21] Appl. No.: 186,114

[22] Filed: Sep. 11, 1980

[51] Int. Cl.³ .............................................. F24D 11/00
[52] U.S. Cl. ........................................ 165/45; 62/260
[58] Field of Search ..................... 165/45, 18, 153, 48; 237/2 R, 1 R, 2 B; 62/260

[56] References Cited

U.S. PATENT DOCUMENTS

| | | | |
|---|---|---|---|
| 2,178,176 | 10/1939 | Lamm | 165/45 |
| 2,323,122 | 6/1943 | Crawford | 165/45 |
| 3,812,903 | 5/1974 | Thomason | 165/18 X |
| 4,196,719 | 4/1980 | Skrivseth | 165/18 X |
| 4,234,037 | 11/1980 | Rogers et al. | 165/45 X |

FOREIGN PATENT DOCUMENTS 514673 12/1930 Fed. Rep. of Germany ........ 165/45

*Primary Examiner*—William R. Cline
*Assistant Examiner*—Theophil W. Streule, Jr.
*Attorney, Agent, or Firm*—Ely Silverman

[57] ABSTRACT

In a system and process for heating and cooling a house, circulated and/or intake air is passed through a system which utilizes low intensity and readily available geothermal heat capacity to heat or cool such air. The ducts of the system have an internal configuration and size that provides for relatively low velocity and correspondingly low pressure drop through such ducts yet provides air flow patterns that have sufficiently high air velocities adjacent the interior surface of the duct to provide extremely good heat exchange between such air and the interior surfaces of the ducts to utilize the low intensity temperature differentials provided by the earth mantle at only moderate depths adjacent a house in any of a great variety of areas. The exterior surfaces of the ducts are shaped to avoid compaction of porous filling material located between the relatively small diameter ducts and the large diameter hole in which such ducts are located and thereby maintains a porous condition of the material peripheral to the duct and so provides heat exchange by water vapor flow as well as conduction between the external surface of the small diameter ducts and the large surface of the hole in the ground from which desired low intensity heat is absorbed or to which undesired heat is passed.

3 Claims, 12 Drawing Figures

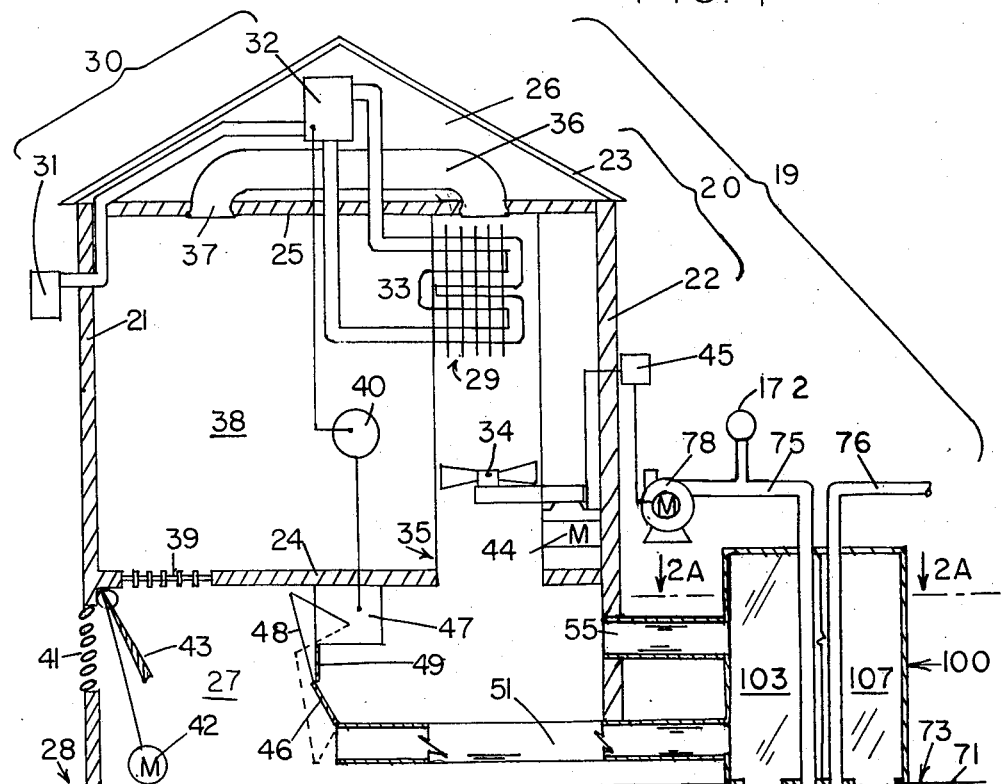
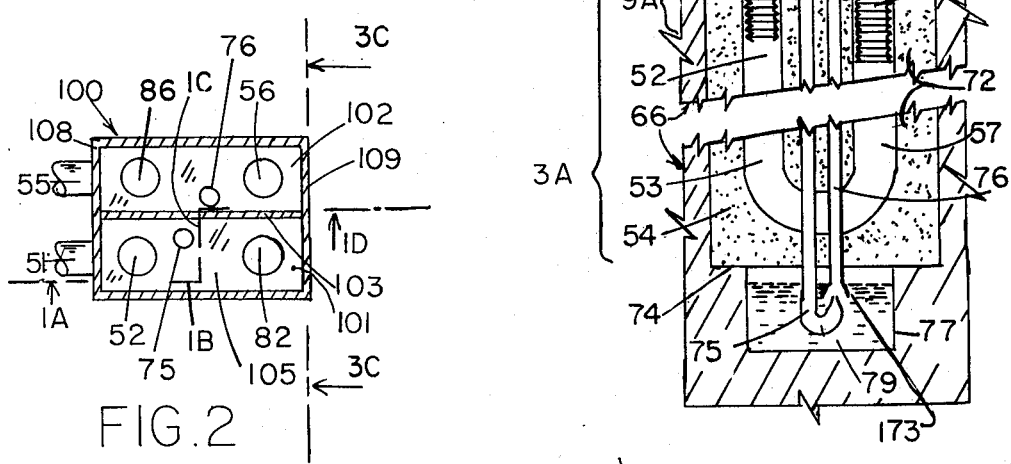
FIG. 1
FIG. 2

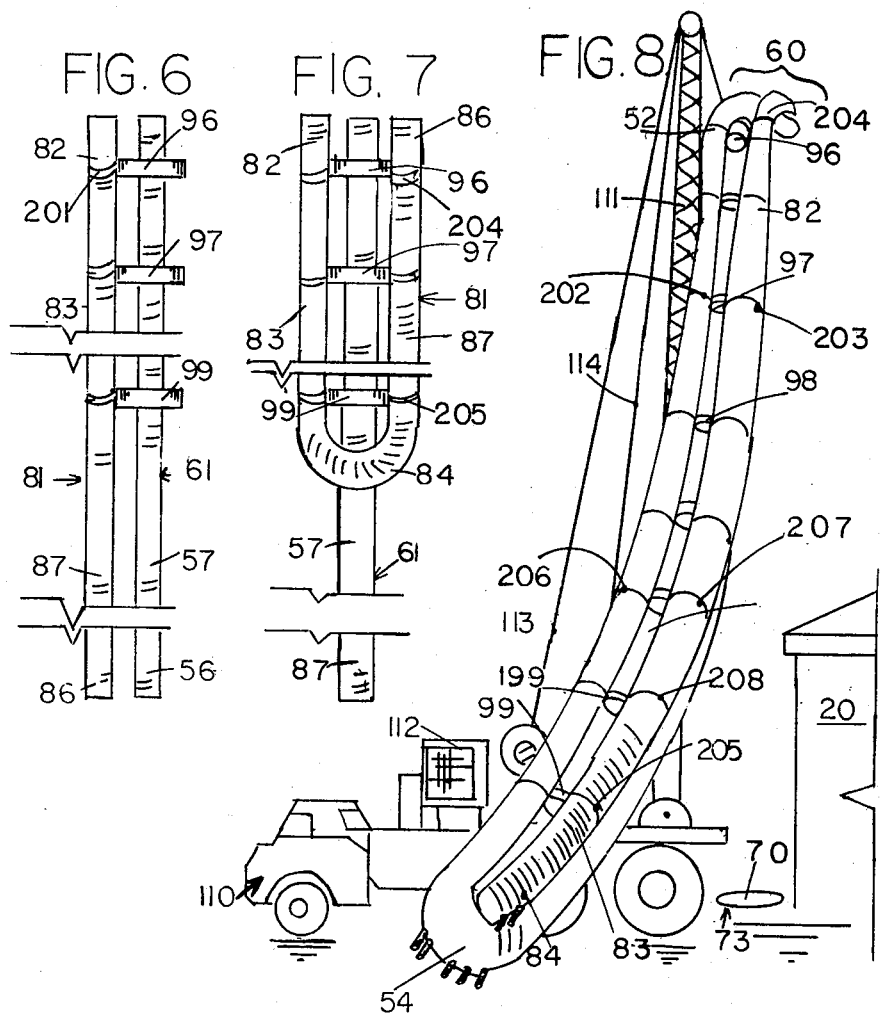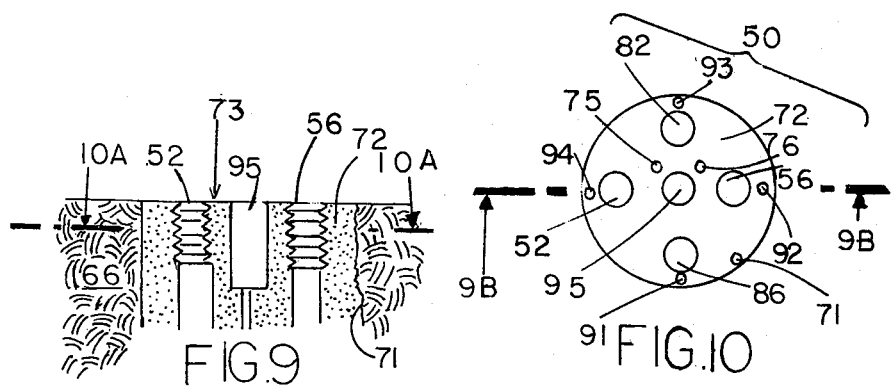

HEAT EXCHANGE SYSTEM AND PROCESS FOR HEATING AND COOLING USING GEOTHERMAL ENERGY

This invention is initially described in our Disclosure Document No. 084536 filed Sept. 13, 1979.

BACKGROUND OF THE INVENTION

This invention relates to heating and cooling of homes by use of supplementary geothermal heating and cooling.

DESCRIPTION OF THE PRIOR ART

The use of geothermal energy to provide mechanical work and energy is old. However, the processes for the use of such energy have utilized geothermal heat sources located at substantial depths (as 5,000 ft. in U.S. Pat. No. 3,140,986 and also great depths in U.S. Pat. Nos. 3,864,917 and 2,461,449) or using locations only whereat there were sources of high temperature available (as in U.S. Pat. Nos. 4,057,964 and 3,274,769 and 3,817,038) although it is known that at 100 ft. depth ground temperatures are approximately 11° C. (52° F.) and geothermal capacity for cooling has been neglected.

In such art temperatures of 150° F. (66° C.) are regarded as low (U.S. Pat. No. 3,953,972) and heat sources at temperatures of at least 240° F. (116° C.) are usually sought (U.S. Pat. No. 3,911,683).

The prior art, as in U.S. Pat. Nos. 4,102,133; 3,939,659; 3,908,381; 3,862,545 and 3,605,403 also has been directed to develop large amounts of energy from large sources of heat in order to provide power to large electric generators which then distribute the energy so developed to distant points of utilization by consumers in heating or cooling homes and other uses of high intensity energy such as running motors and cooking (at high temeratures). These systems are expensive to install and time-consuming to produce.

SUMMARY OF THE INVENTION

As, for the heating and cooling of homes the intensity of energy requirement is not great, the purpose of this system is to utilize readily available geothermal properties and materials for heating and cooling human habitation.

The low intensity temperature maintained by the mantle of the earth is used to provide a sump for cooling or heat absorption when the air temperature in and from a house is greater than the temperature of such mantle temperature although the rate of heat flow provided by from such relatively low intensity heat temperature differential is comparatively small.

The low intensity temperature maintained by the mantle of the earth is used to provide a source of heat when the temperature of air to be passed into a house is lower than the temperature of such mantle temperature although the rate of flow from such relatively low intensity heat temperature differential is comparatively small. By the process of this invention such relatively low intensity temperature heat sumps and small temperature differentials from the earth's mantle are utilized to heat volumes of air. Such volumes of air move at such a low rate of flow that the temperature thereof is changed adequately to provide a useful increase [or decrease] in temperature of the air supply to the heating or cooling system of a house. The system serves to provide for heating and cooling for such houses and to greatly reduce the heat demands on the heating and cooling system of such houses.

BRIEF DESCRIPTION OF DRAWINGS

FIG. 1 is an overall diagrammatic view of a system according to this invention. The portion of this figure showing assembly 50 is shown in this figure as seen along the broken section 1A–1B–1C–1D of FIGS. 1 and 4.

FIG. 2 is a diagrammatic sectional view taken along horizontal plane 2A—2A of FIGS. 1 and 3.

FIG. 6 is a diagrammatic plan view of ducts 61 and 81 in an early stage of manufacture to form duct assembly 60.

FIG. 7 is a diagrammatic plan view of ducts 51 and 81 in a stage of manufacture to form duct assembly 60 subsequent to the stage shown in FIG. 6.

FIG. 8 shows a stage in the installation of the duct assembly 60 to form the geothermal heat exchange assembly 50.

FIG. 9 is a vertical diagrammatic sectional view along the zone 9A in FIG. 1 in a variation of the apparatus of FIG. 1 as seen along the vertical diametric sectional view 9B—9B of FIG. 10.

FIG. 10 is a diagrammatic horizontal sectional view taken along the horizontal plane 10A—10A of FIG. 9.

DESCRIPTION OF THE PREFERRED EMBODIMENTS

Figure 3:
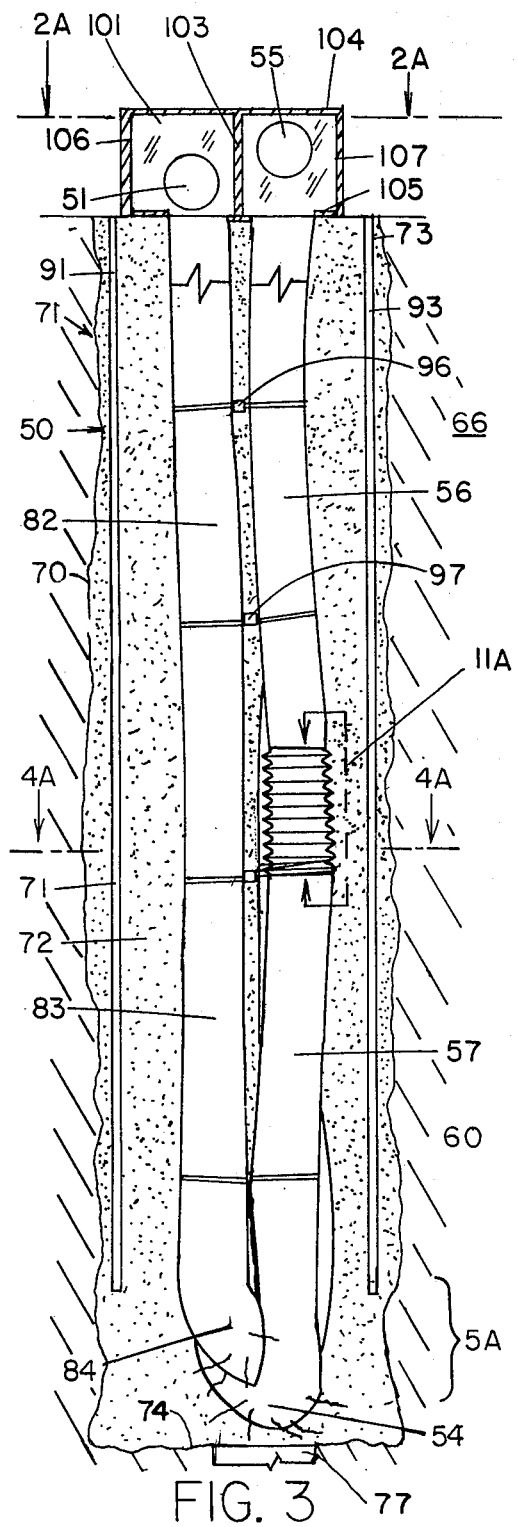
FIG. 3 is a diagrammatic view of the structures shown in that portion of FIG. 1 shown as 3A as seen along the direction of arrow 3B of FIGS. 4 and 5, the duct assembly 60 being shown along the vertical section 3C—3C of FIG. 2 and the hole 70 shown along the vertical diametrical section at plane 1B–1C of FIG. 2.

The overall system 19 comprises a house 20, and geothermal heat exchange assembly 50 attached to the house, the assembly 50 located in an earth mass 66.

A house 20 comprising vertically extending walls 21 and 22 and horizontally extending roof 23 on top of the walls and a floor 24 within the walls is provided with a ceiling 25 on top of the wall 35 and an attic space 26 between the ceiling 25 and the roof 23. A crawl space 27 is located between the floor 24 and the ground 28 underneath the floor.

The house 20 is provided with heating and cooling unit 30 operatively connected to the house. The heating and cooling unit 30 comprises a heat energy inlet 31 such as a gas or electrical inlet and a heater or refrigeration unit 32 which provides heating fluid to coils 33 provided with fins. A fan 34 is located in a vertically extending heat exchange duct 35 in which the coils and fins 29 are located. The duct 35 communicates with a horizontally extending duct 36 located in the attic and that duct has an exit 37 opening to a room space 38. The room space 38 is typical of one of many rooms located in a house 20 between the ceiling 25 and the house floor 24. Air passes from the room space to a return air floor grid 39 located in the floor 24 and opening to the crawl space 27. Additional to the foregoing the heating and cooling unit 30 includes a thermostat control 40 located within the room 38, an air input grid 41 located in the wall of the house below the floor and above the ground 28 and opening to the crawl space, and a louver or valve 43 on the air input grid 41.

The valve 43 is controlled by a motor 42. The fan 34 is operatively connected to and controlled by a motor 44. The geothermal unit 50 has louvers 46 to control the flow thereinto and a motor 47 is operatively connected thereto. The motors 42, 44 and 46 are operatively connected to a power source 45 and to thermostat 40.

The geothermal heat exchange assembly 50 comprises a horizontal feed duct 51, a horizontal discharge duct 55, a first vertical U-shaped duct 61 and a second U-shaped duct 81 and a divider box 100 and a hole 70 in ground 66.

Figure 4:
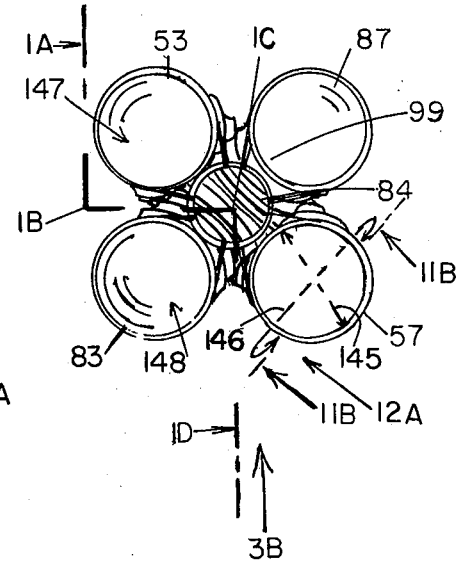
FIG. 4 is a transverse sectional view along the horizontal plane shown as 4A–4B in FIG. 3. The direction of arrow 3B shown in FIG. 4 is also shown by the direction of arrow 3B in FIG. 5.
Figure 5:
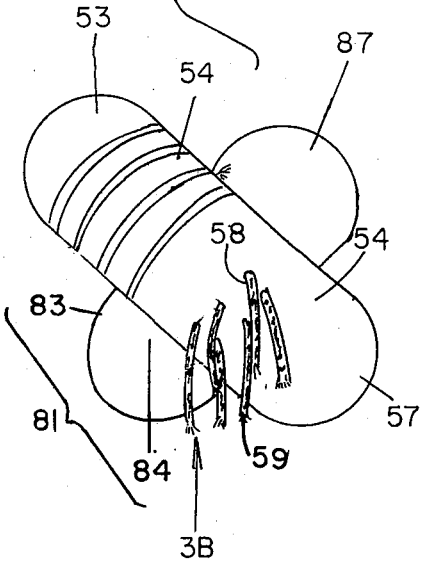
FIG. 5 is a bottom view of the portion of ducts 61 and 81 shown in zone 5A of FIG. 3.

The duct 61 has a first vertical upper portion 52 which extends from the level of the ground 28 in the zone 73, which zone 73 is outside of the house i.e. peripheral to the floor and roof of the house, and a lower portion 53 which is connected to the upper portion and, further, a curved bottom portion 54, generally U-shaped, while a discharge duct has a vertical upper portion 56 and a vertical lower portion 57. The upper portions 52 and 56 are connected to the divider box 100 and the lower portions 53 and 57 are connected to the U-shaped bottom portion 54. The bottom portion is provided with porous wicks as 58 and 59. The first duct 61 is located within the hole 70 and, more particularly, within the boundaries of a cylindrical hole perimeter 71. The perimeter 71 is located peripheral to the boundary or outline of the house. The second duct 81 is composed of a vertical upper portion 82 and a vertical lower portion 83, a U-shaped bottom portion 84, a discharge vertical upper portion 86 and a discharge vertical lower portion 87. The second duct upper portions 82 and 86 are connected to the divider box 100 and the lower duct portions 83 and 87 are connected to the bottom portion 84. The bottom portion is generally C-shaped, convex downwardly, concave upwardly, and is connected at its top and continuous with the second duct portions 83 and 87. The bottom of the second duct is located adjacent to but on top of the bottom portion 54 of the first duct as shown in FIGS. 3, 4 and 8.

The heat exchange assembly 50 also comprises a water discharge inlet line 75 and a water discharge outlet line 76. These extend from the surface 28 of the ground in the area 73 to the bottom of the hole 70 whereat a sump cavity 77 is located. A pump 78 is operatively connected to the line 75 to drive air thereinto at the upper end of the line 75 and thereby pick up any water located in the cavity 77 and drive it up the line 76 to discharge. The cavity 77 is located at the bottom 74 of the hole 70. The bottom of the hole is located somewhat below the bottom of bottom portion 54 of the first duct 61.

Water pipes 91-94 are located within the hole perimeter 71 and extend from the ground 73 to adjacent the bottom 74 of the hole 70. Rings 96-99 are located between the duct portions 53, 57, 83 and 87 and likewise between the portions 52, 56, 82 and 86 to provide spacing therebetween. Such rings also provide for location of a heater tank 95.

The divider box 100 is a rigid rectangular prism having an inlet manifold chamber 101 and an outlet manifold chamber 102 separated by a vertical partition 103.

The ducts 61 and 81 are formed of thin walled corrugated pipe which pipes are rigid. Such pipes are located in a mass of packed sand 72 located within the hole perimeter 71. The corrugated pipes extend downward from openings therefor in the bottom wall 105 of the divider box 101. The side walls 106-109 define the chambers 101 and 102 with top wall 104 and bottom wall 105.

The ducts 61 and 81 extend downward to close to the bottom 74 of the hole 70. Each of the ducts have the same shape throughout its length from one opening of each duct into the inlet manifold of divider box 100 to another opening of the other end as 56 and 86 in the floor 105 of the box 100. Horizontally extending conduits 51 and 55 extend from a wall as 108 of the divider box 100 to the crawl space 27 of the house 20 and open thereinto. One duct as 51 is provided with louvers which are movable and which louvers are located at the opening of the duct 51 to the crawl space 27. As such louver is actuated by a linkage 48 operated by a motor 47 which motor 47 is operatively connected to the thermostat 40 and to a power source 45. The power source operates through the motor 47 in response to the setting of the thermostat 40 to open and/or close the louver 46. Louver 46 and a baffle 49, which baffle extends across opening to duct 35, determine the amount of air flow from rooms as 38 which passes directly to the duct 35 or passes to that duct 35 by way of the ducts 61 and 81 of the geothermal unit 50.

To assemble the apparatus 50, a hole of four feet in diameter and 35 feet deep is dug in an area 73 adjacent the house 20 near to the location where the ducts 51 and 55 may enter the house 20. Sand is placed in the hole to a depth of two to three feet. The cylindrical duct element portions 52 and 53 are laid on the ground side by side with duct portions 82 and 83 as in FIG. 6. Each of several like rigid duct spacer rings 96-99, each formed of a thin rigid corrugated metal sheet formed into a short generally cylindrical ring is then positioned with the geometrical central axis of such circular rings extending in a straight line parallel to the cylindrical axis of the straight duct portions 52 and 53 and 82 and 83 with such rings located adjacent the duct elements 82 and 83 and 52 and 53 as in FIG. 6 and five feet apart from each other along the length of the elements 52 and 53 and is firmly attached as by baling wire to elements 82 and 83 and 52 and 53. The duct elements 87 and 86 are then folded about the C-shaped bottom element 84 and located paralled to elements 52 and 53 and held by baling wire to the rings as shown in FIG. 7. Then elements 56 and 57 are folded about the C-shaped lower end duct portion 54 and arrayed parallel to elements 82 and 83 and are attached firmly to the rings as 96-99. The duct portions 82-87 and 52-57 with the spacer ring elements 96-99 attached thereto form a duct assembly 60. Pipes as 75 and 76 are then attached to the rings as 96-99 sufficiently firmly to be carried thereby during location of the assembly 60 in the hole 70 yet sufficiently loosely as to be later moved along their length to the position thereof shown in FIG. 1. Thereby the pipes 75 and 76 do not project beyond the bottom of the lower duct portion 54 during transport for installation of the assembly 60 into the hole 70 but may be later readily moved into position thereof, as shown in FIG. 1, extending to a level lower than the level or elevation of the bottom of lower duct portion 54.

Baling wire elements 201-208 connect to the like spacer rings as 96, 97, 98, 99, 198 and 199 and firmly hold each of the ducts 61 and 81 to each of the spacer rings. The baling wire and rings hold the ducts in fixed position relative to each other during handling of the duct assembly 60 to locate that duct assembly in the hole 70 with those ducts parallel to each other and vertical in the vertical hole 70 during filling of the hole 70 with sand.

A derrick 120 used to locate the duct assembly 60 in hole 70 comprises a rigid vertically extending adjustable boom 111 and a motor 112 on a frame 113 with cables 113 attached to the motor and the boom operated to manipulate the boom. A lifting cable 114 extends from a reel driven by the motor 112 and is used to elevate and manipulate the duct assembly 60 to locate that assembly within the hole 70. One end of the cable 114 of the derrick cable is attached to the upper end of ducts 61 and 81 as in FIG. 8. The derrick is operated to lift the upper end of the ducts to a height exceeding the length of the ducts and then lower the ducts (with lower bent duct portions 54 and 84 down) into the hole 70. The upper ends 52, 62, 57 and 67 of the ducts are connected to the divider box.

A heating chamber tank 95 may be located between the upper ends of the ducts 61 and 81 as shown in FIGS. 9 and 10.

Tubes 91-94, which are formed of polyvinyl chloride tubes of ½ inch (1.25 cm.) outside diameter with a cap at the base or bottom of each tube, each have 1/16 inch (0.15 cm) diameter holes located 6 inches (15 cm) apart along the length of the tubing, are located in hole 70 near to the duct assembly 60 and peripheral thereto as shown in FIGS. 3 and 10. After locating duct assembly 60 with the longitudinal axis of the ducts extending vertically and the duct assembly substantially centered in the hole 70 and the ducts 91-94 located and the pipes 75 and 76 extending 2 to 3 feet below the level of the bottom of lower duct portion 54, the hole 70 is filled with loose sand to a level 10 feet (3 meters) from the surface. Tank 95 is then positioned in the hole. Backfill with sand is continued unitl the level of backfill is within 1 foot (0.3 meters) of the surface 28 of the earth: that foot is filled with earth that originally came from the hole 70.

Ducts 51 and 55 are 18 inch (46 cm.) diameter insulated duct. They muffle sounds coming from the duct assembly 60 during operation of assembly 50.

In operation of the system 19, air is passed to the house 20 as through louvre 41 to the crawl space 27 or otherwise into the interior of the house; such air in the house between the floors and ceiling thereof, as in room space 38, is passed through a heating and cooling unit as 30 for heating air or cooling air or both via a circulatory path, such as the floor grid 38, and thence to the crawl space 27, and then to a heat exchange feed duct as 35, and via fan 34 to heat exchanger surface 33 and 29 where such air may be heated or cooled or both or neither as needed, to attic duct 36 and thence to the rooms, as 38.

When the temperature of the air to be passed into the rooms is above 80° F. or too high in humidity for comfort as sensed by a thermostat as 40 or an equivalent sensing system, such air to be passed to the room space as 38 is passed to the duct 51 and thence to inlet manifold 101 of the divider box 100 and then to ducts 61 and 81. The temperature of the ground is usually at about 55 degrees Fahrenheit (13° C.). Accordingly such air passed into the duct 51 passes through ducts 61 and 81 to outlet manifold 102 of box 100 is cooled substantially and such cooled air is passed to the ducts 35 and 36 and room space 38.

When the temperature of the air to be passed into the room space as 38 is below 50° F. (14° C.) louver 46 is closed on baffle 49 and air to be passed to rooms as 38 is passed to the duct 51 and thence to inlet manifold 101 of divider box 100 and then to ducts 61 and 81. The temperature of the ground is usually at about 55 degrees Fahrenheit (13° C.). Accordingly such air passed into the duct 51 passes through ducts 61 and 81 to outlet manifold 102 of divider to box 100 is warmed substantially and such warmed air is passed to the ducts 35 and heated at exchanger 33 then passed to duct 36 and space 38.

The ducts 61 and 81 are each formed of stable corrugated plastic having alternating annular ridges as 123 and 133 and grooves as 141 and 142 and internal and external diameters 145 and 146. Each duct as 61 is formed of a continuous series of like annular units as 120, 130, 140, 150 and 160.

Each annular duct wall unit, as 120, is formed of an upper vertically extending internal or central portion 121, an upper radially and horizontally extending portion 122, a lateral vertically extending portion 123, a lower radially and horizontally extending portion 124, and a lower vertically extending central or internal portion 125. The lower central or internal portion 125 is continuous with the upper vertically extending internal central portion 131 of the adjacent annular unit 130. Unit 130 is formed of an upper vertically extending internal or central portion 131, an upper radially and horizontally extending portion 132, a lateral vertically extending portion 133, a lower radially extending portion 134 and a lower vertically extending central or internal portion 135. The lower central or internal portion 135 is continuous with the upper vertically extending internal or central portion like 131 of the adjacent unit 140. Portions 121 and 131, and 122 and 132, and 123 and 133, and 124 and 134, and 125 and 135, respectively, are identical to each other in each of the successive units as 120, 130, 140, 150 and 160 forming the duct 61, and to like units forming the duct 81.

The series of annular units as 120, 130, 140, 150, 160 of which each duct as 51 is formed provide a structure wherein the wall of each duct as 51 is formed of a series of like internal ridges formed by walls as 121, 125, 126, 127, 128 and 129 and like internal furrows 151-155 each of such internal ridges and furrows being transverse to the length of the duct 51. Also, each duct as 51 has a series of like external ridges as 123 and 133, and like external furrows as 141, 142, 143 and 144. The external ridges and furrows all extend transverse to the length of the duct 51. Each of the internal furrows as 151 is located between the internal surfaces of duct wall portions as 122 and 124 and is bounded laterally by an internal surface of a lateral vertically extending duct wall ridge portion as 123. The internal furrow 152 is lcoated between internal surfaces of walls 132 and 134 and is bounded laterally by wall 133; all internal furrows of duct 51 are similarly bounded by internal walls of the ducts wall units forming the duct 51. The depth of an internal furrow 152 is shown as 135 in FIG. 11. The length of an internal furrow 153 is shown as 136.

Each external ridge as 123 is formed by the lateral vertically extending duct wall portion as 123 and 133 of each of the corrugated units as 120 and 130 and projects laterally of the nearest vertically extending central or internal duct wall portion as 125.

Each external furrow as 141 extends centrally to the most central portion of the outside surface of a central vertically extending duct wall portion as 125 and extends laterally to a cylindrical surface to which the outside surface of the lateral vertically extending duct wall ridge portions as 123 and 133 are tangent. The depth of such external furrows is shown as 138 in FIG. 11 and the maximum width of such external furrow, at the lateral opening thereof is shown as 139. The lateral opening of the external furrow 144 is indicated as 137 in FIG. 11.

The sand applied to the hole 70 as backfilling fills the space between the hole perimeter 71 and the vertically extending lateral duct wall portions as 123 and 133. However, the lateral vertically extending duct wall portions as 123 and 133 and openings as 137 project sufficiently radially of the central vertically extending duct wall portions as 121 and 125 and, also, the radially extending duct wall portions as 122 and 124 and 132 and 134 extend sufficiently in a horizontal direction, rather in a vertical direction, that the earth applied to the opening of the external furrows as 141-144, (between external ridges as 123 and 133) does not totally fill such furrows. The furrows are not filled because the angle of repose of the sand filling material, 72, internal of each external opening (as 137) of each of the furrows, as between the vertically extending lateral edges 123 and 133 of the adjacent corrugated units as 120 and 130, provides a sloped surface 149 (of such fill material) which intersects the upper surface of wall duct portion, as 132, of each unit as 130 immediately below such external furrow. This condition results because the lower surface of each lower radially extending duct wall portion, as 124, and the neighboring upper surface radially extending wall portion, as 132, extend in major part from the inner or central vertically extending wall as 125 at an angle which is substantially horizontal and clearly less than the angle of repose of the sand with which the hole 70 is backfilled. Such filler 72 located in such external furrows stays in porous condition immediately adjacent the exterior surfaces of the duct in the furrow and also provides that the earth immediately adjacent the lateral vertically extending walls as 123 and 133 is also porous. Such porous filling of the external furrows provides for an effective heat transfer from the exterior surface of the ducts as 61 and 81 to the perimeter or periphery 71 of the hole 70 by water vapor traveling and so transfering heat between interstices of the filling sand 72 as well as providing for heat transfer by conduction through the volume of the solid particles of such mass of filling material 72. Such heat transfer system of corrugated ducts and porous mass 72 utilizes the large surface of the perimeter of the hole 70 to transfer heat to and from the mass of earth 66 rather than the limited radially facing portions of the surfaces of the ducts 51 and 81 while the internal diameter as 145 of each of the ducts as 61 and 81 is sufficiently small that the flow of air therethrough is, especially because of the internal surface of the ducts, turbulent.

As each individual particle of the sand filling material 72 has a density of 2.6± grams per cm$^3$ (159-165 lbs. per cu. ft.) sand mass 72 has an overall percentage of void space porosity of 30-32% of the total volume of mass 72.

In a prferred embodiment the internal diameter 145 of the ducts 51 and 81 is 12 inches (30.5 cm.) and the external diameter 146 of the ducts 51 and 81 is 14 inches (35.6 cm.). The axial length 136 of each internal furrow as 151-155, as from center of one internal ridge as 125 to center of ridge 126, is 2 1/16 inches (5.4 cm.) parallel to length of duct 51. The depth, as 135, of each internal furrow, as 151-155, or its radial length, measured transverse to length of the duct 51, is 1 7/32 inches (3.1 cm.). The total depth, as 138, of each external furrow as 141-144, measured radially or transverse to the length of the duct as 51, is 1 7/32 inches (3.1 cm.). The width, as 139, or axial length of each external furrow, as 141-144, measured between points on the external surface of the duct whereat the angle to the horizontal of the vertical duct surface is 45°—which points determine the width as 137 of the opening of such external furrows—is 11/16 inches (2.4 cm.). Such opening 137 is 1 1/32 inches (2.62 cm.) from the bottom or most central portion of the external furrow. The radially extending duct wall portions as 122 and 124 are, as at portion 162, flat for ¾ inch (1.9 cm.) between the curved portion of central wall 123 and curved edge of wall 123. Such flat portions of walls as 122 and 124 extend laterally in surfaces at a solid angle, 169, of 80° to a vertical line, as 170, or the axis of the vertical duct 51. The thickness of the wall portions as 121-125 of the duct is 3/32 inches (0.25 cm.). The radius of curvature 161 of the external surface at the bottom of the external furrow is 19/64 inch (0.8 cm.). The radius of curvature 165 of the internal surface of each internal furrow as 151 at the junction of the lateral vertically extending wall portion as 123 with the lower radially extending wall portion 124 and, at 163, at the junction of lateral vertically extending wall 123 with upper radially extending wall portion 122 is 19/64 inch (0.80 cm.). The axial distance as 166 across each internal furrow at the middle of depth of the internal furrow—halfway between internal ridges as 125-129 and internal surface of vertical radial wall portions as 123—is 1 19/64 inch (3.4 cm.): such axial length 166 of each internal furrow is thus greater or wider (by ⅜) than the axial length or width of each external furrow at the middle of the frustoconical portions thereof as 162. The external surface as 164 of the lateral vertically extending wall portions as 123 is substantially flat; it has a slightly curved surface 2.2 cm long measured axially, or parallel to the length of the duct. The ends as 167 and 168 of such external surface 164 extend centrally 0.2 cm prior to joining the portions 122 and 124 via the curved portions with radius of curvature as 165 and 163.

The internal ridges as 125, 126, 127, 128 and 129 of the duct walls project sufficiently into the cavity as 147 and 148 of the ducts 61 and 81 respectively to produce an air flow velocity immediately adjacent the internal ridges as 125-129 which is as great as the velocity of air flow at the center of those ducts and so obviates the usual low rate of heat transfer at the interior surface of cylindrical pipes, which usual low rate of heat transfer is due to the usually much lower velocity of the mass of air adjacent an interior cylindrical duct surface in a duct.

The internal ridge-to-internal ridge distance, as 136, between centers of iternal ridges, as 126 and 127, is over twice the distance across the ridges, as 125, measured across horizontally and radially extending wall duct portions, as 124 and 132, immediately adjacent each such internal ridge. Accordingly air flow in duct 51 sweeps past the lateral vertically extending duct portions as 123 and 133. Also, the maximum depth as 135 of the internal furrows as 151–155 from internal ridge as 125 to internal surface of lateral wall 133 of furrow 152 provides a transverse cross section area of the furrow which cross section area is less than one-half of the cross section area of the duct 51 although more than 25% (and is 26% in the preferred embodiment) measured across the minimum duct diameter as 145. Thereby the volume of air passing through ducts 61 and 81 subjected to radially and centrally directed paths of flow in the internal furrows as 151–155 is substantial yet less than the volume of air in generally axial flow in the central portion of such ducts. Such internal configuration of the ducts reduces the pressure drop from inlet manifold 101 of divider box 100 and entry portion as 52 to outlet portion as 57 of each duct as 61 and 81 and outlet manifold 102 of the divider box 100.

The porous wicks as 58 and 59 are formed of synthetic fiber rope as nylon each of which is $\frac{1}{2}$ inch (12.7 cm.) in diameter and one to two feet (0.3 to 0.6 meters) long. Such wicks are not affected by bacteria in the ground, and also are not corroded by moisture and/or air. Each of four to eight such wicks are attached to one of four to eight respectively adjacent internal furrows near the bottom portions 54 and 84 of each of ducts 61 and 81. The upper end of each of such wicks extends into and is firmly held in water-tight connection to the interior surface of an interior furrow as 151–154 located in the bottom portions 54 and 84 of the ducts 51 and 81. The porous wicks provide for automatic passage of condensed moisture located in the internal furrows at the bottom of ducts 61 and 81 into the mass of sand below the U-shaped duct bottom portions 54 and 84 and so maintain the cavities 147 and 148 of ducts 61 and 81 in open condition notwithstanding condensation of moisture in such cavities during cooling of moist warm air in those ducts while such wicks also prevent air from passing into or out of the ducts.

In operation the system 19 passes air through the duct assembly 60 using only an already installed fan, as 34, of the central heating system 30 usually initially operatively installed in a house as 20; such system 30 is usually provided with a duct as 35 leading to the fan and a heater or cooling apparatus as 29 and 33 and one or more ducts as 36 leading from the heating and/or cooling coils to the rooms, as 38, of the house. The geothermal heat exchange system 50 is operatively located to treat the air passed into the room between the point of exhaust of air from the rooms of the house and the point of entry of the air into the rooms. The duct system 60 may be on the intake side of the fan 34 as is shown in FIG. 1 or may be on the exhaust side of the fan.

The sump cavity 77 is 2 feet deep and 2 to 3 feet in diameter. In operation of system 19 water which gathers in the sump as 77 is driven out of the sump by air which is passed under pressure by blower 78 into the J-shaped pipe 75 and into a bell 173 at the bottom of vertical narrow discharge pipe 76. Such air drives water within the bell 173 upward of the pipe 76 and such water is discharged at the upper end of the pipe 76. The need for discharge of liquid in the sump 77 can be effected automatically by an electrical liquid level sensor at the bottom of hole 70 which sensor automatically activates the blower 78 on detecting the level of a body of water in the sump 77 at a predetermined level. Alternatively, the back pressure at top of pipe 75 can be periodically tested at a pressure sensor 172 while the blower 78 is run at a low speed to determine if there is a body of water above the level of the bell 173 in the sump 77 and, in response to such sensing of a body of water in the sump and, thereby, near to the bottom portion of duct 51, turning the blower 78 on to full power and so lower the level of the water in the sump to the level of the bottom of the bell at the bottom of pipe 76.

The ducts 51 and 81 are made of high density polyethylene with a melting point of 120°–140° C. and with a specific gravity of 0.941 to 0.965 (an average of 0.955). Carbon block is added to 5% by weight. The thermal conductivity of the duct material is high i.e. 11.0 to $12.4 \times 10^{-4}$ cal./sec./sq. cm./°C./cm. The duct wall material has a tensile strength of 3100–5500 p.s.i. and a Rockwell hardness (Shore) of D60–D70.

The spacer rings as 96–99 and 198–199 are rigid cylinders of 15 inches (38 cm.) diameter and 6 inches (15 cm.) long and preferably made of 20 guage steel. The spacer rings are spaced apart 5 feet from each other along the length of duct assembly 60 and are sufficiently firmly joined to the ducts as 51 and 81 as by baling wire to permit manipulation of the duct assembly for location of the duct assembly in the hole 70.

In a preferred embodiment of the system 19, a hole 70 is formed with a 4 foot diameter and is 45 foot deep; air enters at 60° F. and is cooled when the input temperature to the duct 51 is above 60° and is warmed when the air temperature fed to the duct as 51 and 81 is below 40° as below described. The air speed in the ducts 61 and 81 in the axial direction, i.e. along the longitudinal axis of the ducts, ranges from 150 to 200 feet per minute at the center of cavity 147 to speeds of 250 to 350 feet per minute immediately adjacent the periphery of the internal furrows. The Reynolds number value for such axial flow is above the critical value for turbulent flow and is in the turbulent flow range (of over 3,000.)

In the operation of one duct as 61 using a hole 70 of 60 feet (18.3 m) depth and $3\frac{1}{2}$ feet (1.07 m.) diameter the temperature of the input air to the upper or input portion as 52 of a duct as 51 and the output temperatures of the upper or output portions as 56 are as in Table I herebelow.

Accordingly the geothermal effect of using the earth's mantle as a heat source as in examples 3, 4, 5, 6 and 7 or as a sump as in 1, 2 and 9 of Table I is effective with only small temperature gradients (i.e. gradients of less than 5° F.) to provide a change in temperature of inlet air to the system 30. The change in air temperature provided by system 50 provides a reduction on the heating and cooling load otherwise placed on the heating and/or cooling system of such building especially during hot weather of over 90° F. inlet air temperature to system 50 because of the large temperature differential between such inlet temperature and the temperature level of 55°–60° F. provided by the ground mass.

The above described systems 19 and 50 are located in Potter County, Tex., U.S.A. whereat there is no high temperature geothermal source.

Because (a) the external surfaces of horizontally extending portions as 122 and 124 of the duct walls, extend at angles as 169 to the vertical, as 170, far greater than the angle of repose of the sandy fill material as 72, and (b) adjacent laterally extending portions, as 124 and 132 of neighboring walls of each internal ridge as 125–129 between internal furrows as 151 and 152, extend laterally for a greater distance than the vertical distance as 137 across the external furrows as 140, shifting of the sandy porous fill material 72 or the ground of ducts does not put stresses on those horizontally extending portions to strain or deform them relative to the lateral vertically extending wall portions as 123; hence the ducts 61 and 81 are mechanically stable even though the walls of such ducts are thin enough to provide good heat transfer chacteristics therethrough.

This change in duct air temperature provided by the relatively low sensible input temperature of the ground mass 66 used in the auxiliary heating system 50 provides a substantial change notwithstanding the low rate of heat flow available for such heat transfer. Because of the low rate of volume flow of air through the auxiliary system such low rate of flow or small weight of air is capable of receiving or accepting the needed heat flow and thereby such air within that auxiliary heat system duct undergoes a substantial change in temperature. Accordingly this system provides that, notwithstanding the low rate of flow of the heated medium (air in this case) there is an adequate mixing of such air so as to provide a thorough adequate efficient transfer of the heat from the ground heat source to the heat transfer surfaces by avoiding a laminar flow of air adjacent the duct surfaces although the rate of air flow is sufficiently low to provide long times of contact of air and duct surface. By providing a turbulent flow at a low rate of total flow the air accepts efficiently the available temperature differential between the heat source and the heat transfer surface provided by the duct portions of this system.

In the embodiment of system 19 above described, the unit 30 comprises air heating and circulation system Model C-100U, Series 510, No. 0162 834 of Day and Night Air Conditioning Manufacturing Company of La Puente, Calif., with only a small size motor for its fan.

While the apparatus and installation are above described for particular embodiments and dimensions, the hole 70 may be 30 to 80 feet deep to obtain the above described characteristics and results with diameter of 52 inches or larger for system 50. Further, where underground streams or bodies of water are located that would effect the stability of a hole as 70 the system as 19 utilizing capacity of mass of earth near to its surface to provide a source of heat at 55° F. (12.8° C.) or to provide for absorption of heat at levels over 60° F. (15.6° C.) is provided by using ducts as 51 and 81 connected in an assembly as duct assembly 60 where the ducts are connected to a divider box as 100 and such ducts are located in the earth to extend horizontally in a horizontally extending straight trench having a lower wall 15 feet (4.6 meters) or more below the surface of the earth; such trench houses the ducts as 51 and 81 and such trench is filled upwards of such lower wall and around the ducts to a depth of 52 inches (1.32 meters) with sand to provide heat exchange between air and duct surface and between duct surface and earth mass through the interstices of the porous sand mass as above described for the geothermal exchange assembly 50. Wicks as 58 and 59 extend from the lowermost portions of the internal furrows in the bottom portion of earth duct into the porous sand mass below such ducts to provide for removal of condensed moisture and water from such ducts, which water as formed develop during cooling of air carrying sufficient moisture to provide for condensation at 55° F.(12.8° C.).

TABLE 1

TEMPERATURE OF AIR DURING OPERATION OF SYSTEM 50

| Example No. | Room Temp °F. [°C.] | Air Inlet Temp °F. at 51 [°C.] | Air Outlet Temp °F. at 55 [°C.] | Outside Air Temp °F. [°C.] |
|---|---|---|---|---|
| 1 | 86[30.0] | 82[27.8] | 67[19.4] | |
| 2 | 83[28.3] | 81[27.2] | 67[19.4] | |
| 3 | | 44[6.67] | 56[13.3] | |
| 4 | | 46[7.8] | 56[13.3] | |
| 5 | | 48[8.9] | 56[13.3] | |
| 6 | | 54[12.2] | 56[13.3] | 43[6.1] |
| 7 | | 48[8.9] | 55[12.8] | 42[5.6] |
| 8 | | 49[9.4] | 55[12.8] | 28[−2.2] |
| 9 | | 67[19.4] | 58[14.4] | 62[16.7] |

Figure 11:
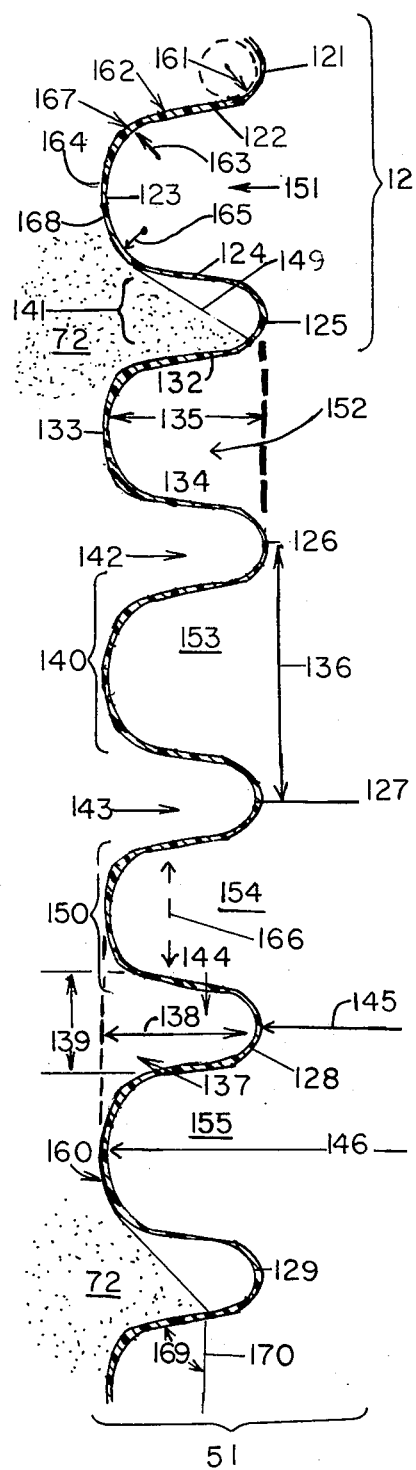
FIG. 11 is a diametral sectional view in zone 11A of FIG. 3 along the vertical plane 11B—11B of FIG. 4.
Figure 12:
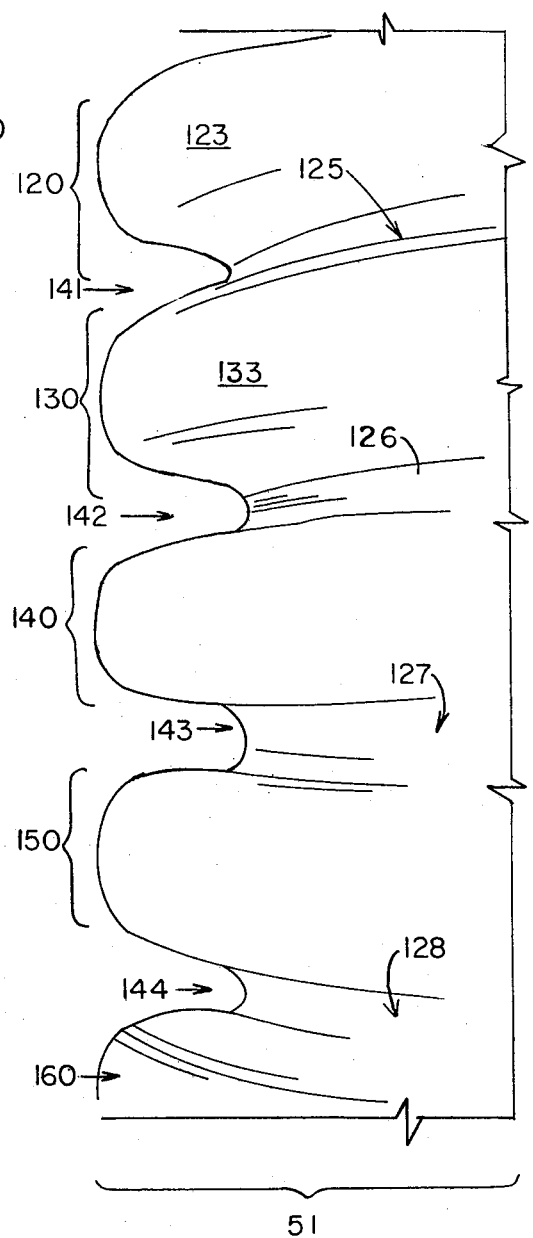
FIG. 12 is a side view in zone 11A of FIG. 3 along direction 12A of FIG. 4.

In operation of this process and choice of duct dimensions, the linear air velocity in the duct parallel to the longitudinal axis of the generally circular sectioned or cylindrical duct is maintained low enough—below 400 feet per minute—to provide enough contact time and surface area for a sensible heat difference between the input to and the output from the ducts. However, the volume of air passed per minute (or other unit of time) through the ducts is high enough relative to the duct diameter for turbulence (i.e. Reynolds number to exceed 3,000), whereby at such low axial velocity the air in the center of the ducts is turbulent. Further, the shape of ducts, as shown in FIGS. 11 and 12, provides that the air at the peripheral portion of the ducts is turbulent while concurrently the duct diameter and length are large enough to provide surface area for efficient heat transfer between air in the ducts and the peripheral porous mass as 72 and so effect heat transfer with the earth mass as 66 surrounding the porous mass. In the particular preferred embodiment of system 19 and assembly 50 above described with ducts 61 and 81 each 70 feet long and a velocity of air in the ducts as 61 and 81 of 200 feet per minute the contact time of air in duct is 21 seconds and the surface area of the ducts is (70 feet per duct×2π ft. sq. per linear foot×2 ducts=280π) 880 square feet and the weight of air is (2π[equals duct area]×200 feet per minute [equals velocity]×0.081 pounds per foot cube [density]=102 pounds [per minute]) 35 pounds in the 21 second contact time period. Faster flow rates as 300 feet per minute result in less contact time for the same weight of air exposed to the duct surfaces during operation of the fan as 34 and system 19. Axial air flow speeds of 150–350 feet per minute are used in this process.

In the preferred embodiment of system 19 above described, the motor 44 has 1/6 horsepower capacity and, with fan 34, has 1,150 c.f.m. capacity. House 20 is a single story house with 1,700 square feet living area and a crawl space and attic connected as above described and shown in FIG. 1.

We claim:

1. A heating and cooling system for a house comprising, in operative combination, a heat exchange unit for altering the temperature of air, ducts leading from said unit to rooms in said house and air confinement means extending from said rooms to said heat exchange unit, and a geothermal heat exchange system having an outlet duct operatively connected to said heat exchange unit, a mass of ground extending downward 30 to 80 feet from the upper surface of said ground, a downwardly extending hole extending from said surface of said ground, a pair of downwardly extending ducts in the hole, a space between said ducts and the interior of said hole, and a porous mass in said space between said ducts and the interior of said hole, said space containing water vapor but substantially completely free of liquid water, each of said pair of ducts in heat conducting relationship with said porous mass and downwardly extending into said ground to a depth of 30 to 80 feet, each of said ducts joined to each other at a bottom end thereof, said ducts each having walls with a continuous series of corrugations surrounding an internal cavity, each of said corrugations having a centrally extending internal ridge and a radially extending internal furrow, each of said ridges and furrows extending transversely to the length of the duct, the surface area of the duct wall being at least $2\pi D L$ for each unit of length of the duct wall measured parallel to the length of the duct in units of length greater than L wherein D is minimum diameter of the duct between said internal ridges and L is the length in feet between said ridges of said corrugations, the cross-section area of the internal furrows of the duct measured transversely between said internal ridges being between 25 and 33% of the cross-sectional area of the cavity of said duct measured transversely to the length of the duct and between the internal ridges, and an inlet duct of said pair of ducts operatively connects to an air discharge opening from said rooms, and wherein a portion of the hole extends downwardly below said ducts, a liquid conduit means extends below said ducts in the hole, and a liquid impelling means located below said ducts is operatively connected to said liquid conduit means whereby to move liquid from the portion of the hole below said ducts upwardly and out of said hole and maintain the exterior surface of said ducts free of contact with liquid water.

2. A system as in claim 1 wherein said ducts are formed with an external diameter of 12 inches and an internal diameter of 14 inches and a distance of 2 1/16 inches between said internal ridges and the internal diameter of said hole is in range of 42 to 48 inches.

3. A system as in claim 2 wherein said ducts comprise a plurality of wick means extending downward from the bottom of said ducts into said porous mass.

* * * * *